(12) United States Patent
Little et al.

(10) Patent No.: US 8,670,224 B2
(45) Date of Patent: Mar. 11, 2014

(54) POWER MANAGEMENT SYSTEM THAT INCLUDES A MEMBRANE

(75) Inventors: Michael T. Little, Sheboygan, WI (US); Brian T. Willmas, Kiel, WI (US); Anthony J. Hackbarth, Sheboygan, WI (US); William S. Dempster, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 265 days.

(21) Appl. No.: 13/289,098

(22) Filed: Nov. 4, 2011

(65) Prior Publication Data

US 2013/0114186 A1    May 9, 2013

(51) Int. Cl.
*H02B 1/26* (2006.01)

(52) U.S. Cl.
USPC .......................................... 361/622; 361/632

(58) Field of Classification Search
None
See application file for complete search history.

(56) References Cited

U.S. PATENT DOCUMENTS

| | | | |
|---|---|---|---|
| 2,042,848 A * | 6/1936 | Horn | 312/204 |
| 4,031,406 A | 6/1977 | Leyde et al. | |
| 4,034,233 A | 7/1977 | Leyde | |
| 4,064,485 A | 12/1977 | Leyde | |
| 4,672,227 A * | 6/1987 | Lagree et al. | 307/64 |
| 4,812,744 A * | 3/1989 | Havel | 324/115 |
| 5,095,403 A * | 3/1992 | Pin et al. | 361/641 |
| 5,414,640 A | 5/1995 | Seem | |
| 5,422,517 A | 6/1995 | Verney et al. | |
| 5,604,421 A | 2/1997 | Barnsley | |
| 5,684,710 A | 11/1997 | Ehlers et al. | |
| 5,861,683 A | 1/1999 | Engel et al. | |
| 5,870,276 A * | 2/1999 | Leach et al. | 361/627 |
| 6,107,701 A * | 8/2000 | Flegel | 307/125 |
| 6,172,432 B1 | 1/2001 | Schnackenberg et al. | |
| 6,191,500 B1 | 2/2001 | Toy | |
| 6,329,907 B1 * | 12/2001 | Uischner et al. | 340/333 |
| 6,531,790 B2 * | 3/2003 | Panuce et al. | 307/64 |
| 6,552,888 B2 | 4/2003 | Weinberger | |
| 6,739,145 B2 | 5/2004 | Bhatnagar | |
| 6,747,368 B2 | 6/2004 | Jarrett, Jr. | |
| 6,798,187 B1 | 9/2004 | Czarnecki | |
| 6,801,019 B2 | 10/2004 | Haydock et al. | |
| 6,833,694 B2 | 12/2004 | Ikekame | |
| 6,876,103 B2 | 4/2005 | Radusewicz | |
| 6,912,889 B2 | 7/2005 | Staphanos et al. | |
| 6,983,640 B1 | 1/2006 | Staphanos et al. | |
| 7,015,599 B2 | 3/2006 | Gull et al. | |
| 7,053,497 B2 | 5/2006 | Sodemann et al. | |
| 7,133,787 B2 | 11/2006 | Mizumaki | |
| 7,136,278 B2 * | 11/2006 | Allen | 361/647 |
| 7,146,256 B2 | 12/2006 | Hibi et al. | |
| 7,149,605 B2 | 12/2006 | Chassin et al. | |
| 7,177,612 B2 | 2/2007 | Nakamura et al. | |
| 7,177,728 B2 | 2/2007 | Gardner | |
| 7,208,850 B2 | 4/2007 | Turner | |
| 7,218,507 B2 * | 5/2007 | Reker et al. | 361/641 |
| 7,218,998 B1 | 5/2007 | Neale | |

(Continued)

*Primary Examiner* — Gregory Thompson
(74) *Attorney, Agent, or Firm* — Schwegman Lundberg & Woessner, P.A.

(57) ABSTRACT

Some embodiments relate to a power management system includes a primary power source and a secondary power source. The power management system further includes an enclosure and an electrical component located within the enclosure. The electrical component is connected to the primary power source and the secondary power source. The power management system further includes a membrane that is mounted to an outside of the enclosure. The membrane extends through the enclosure such that the membrane provides information relating to operation of the power management system.

21 Claims, 7 Drawing Sheets

(56) References Cited

U.S. PATENT DOCUMENTS

| | | |
|---|---|---|
| 7,239,045 B2 | 7/2007 | Lathrop |
| 7,245,036 B2 | 7/2007 | Endou et al. |
| 7,274,974 B2 | 9/2007 | Brown |
| 7,336,003 B2 | 2/2008 | Lathrop et al. |
| 7,356,384 B2 | 4/2008 | Gull et al. |
| 7,446,425 B2 | 11/2008 | Sato |
| 7,579,712 B2 | 8/2009 | Yanagihashi et al. |
| 7,582,986 B2 | 9/2009 | Folkers et al. |
| 7,608,948 B2 | 10/2009 | Nearhoof et al. |
| 7,715,951 B2 | 5/2010 | Forbes, Jr. et al. |
| 7,747,355 B2 | 6/2010 | Bulthaup et al. |
| 7,778,737 B2 | 8/2010 | Rossi et al. |
| 7,795,851 B2 | 9/2010 | Ye et al. |
| 7,800,888 B2 * | 9/2010 | Morris et al. ............... 361/614 |
| 8,395,884 B1 * | 3/2013 | Czarnecki .................. 361/643 |
| 2003/0107349 A1 | 6/2003 | Haydock et al. |
| 2004/0051515 A1 | 3/2004 | Ikekame |
| 2004/0075343 A1 | 4/2004 | Wareham et al. |
| 2005/0059373 A1 | 3/2005 | Nakamura et al. |
| 2005/0063117 A1 | 3/2005 | Amano et al. |
| 2005/0072220 A1 | 4/2005 | Staphanos et al. |
| 2005/0116814 A1 | 6/2005 | Rodgers et al. |
| 2005/0128659 A1 | 6/2005 | Hibi et al. |
| 2005/0188745 A1 | 9/2005 | Staphanos et al. |
| 2005/0216131 A1 | 9/2005 | Sodemann et al. |
| 2006/0203814 A1 | 9/2006 | Ye et al. |
| 2006/0284843 A1 | 12/2006 | Endou et al. |
| 2007/0010916 A1 | 1/2007 | Rodgers et al. |
| 2007/0120538 A1 | 5/2007 | Sato |
| 2007/0129851 A1 | 6/2007 | Rossi et al. |
| 2007/0222294 A1 | 9/2007 | Tsukida et al. |
| 2007/0222295 A1 | 9/2007 | Wareham |
| 2009/0179498 A1 | 7/2009 | Lathrop et al. |
| 2009/0216386 A1 | 8/2009 | Wedel |
| 2009/0290270 A1 | 11/2009 | Ganev et al. |
| 2010/0019574 A1 | 1/2010 | Baldassarre et al. |
| 2010/0038966 A1 | 2/2010 | Espeut, Jr. |
| 2010/0094475 A1 | 4/2010 | Masters et al. |
| 2010/0225167 A1 | 9/2010 | Stair et al. |
| 2011/0109291 A1 | 5/2011 | Tang et al. |
| 2012/0162862 A1 * | 6/2012 | Cosley et al. ............... 361/644 |

\* cited by examiner

POWER MANAGEMENT SYSTEM THAT INCLUDES A MEMBRANE

TECHNICAL FIELD

Embodiments pertain to a power management system that includes a membrane, and more particularly to a power management system that includes a membrane adhered to an enclosure.

BACKGROUND

One of the drawbacks with operating existing power management systems under existing personal protective equipment (PPE) regulations is the inability to verify status of electrical equipment located inside enclosures without removing a cover or opening a door. This inability may be especially problematic in outdoor applications where fitting enclosures with visible and accessible user interfaces or status indicators is oftentimes costly and/or complex. Many existing systems often place user interfaces or status indicators in dead front panels located behind a door or extra cover. Some systems may also utilize extensive gasketing and/or a customized mounting apparatus in order to adequately locate user interfaces or status indicators.

Therefore, a need exists for a power management system that includes a cost-effective indicator which provides information to a user relating to operation of the power management system. The power management system should also be able to reduce the need to expose users to potentially hazardous voltage and aid in quick troubleshooting.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
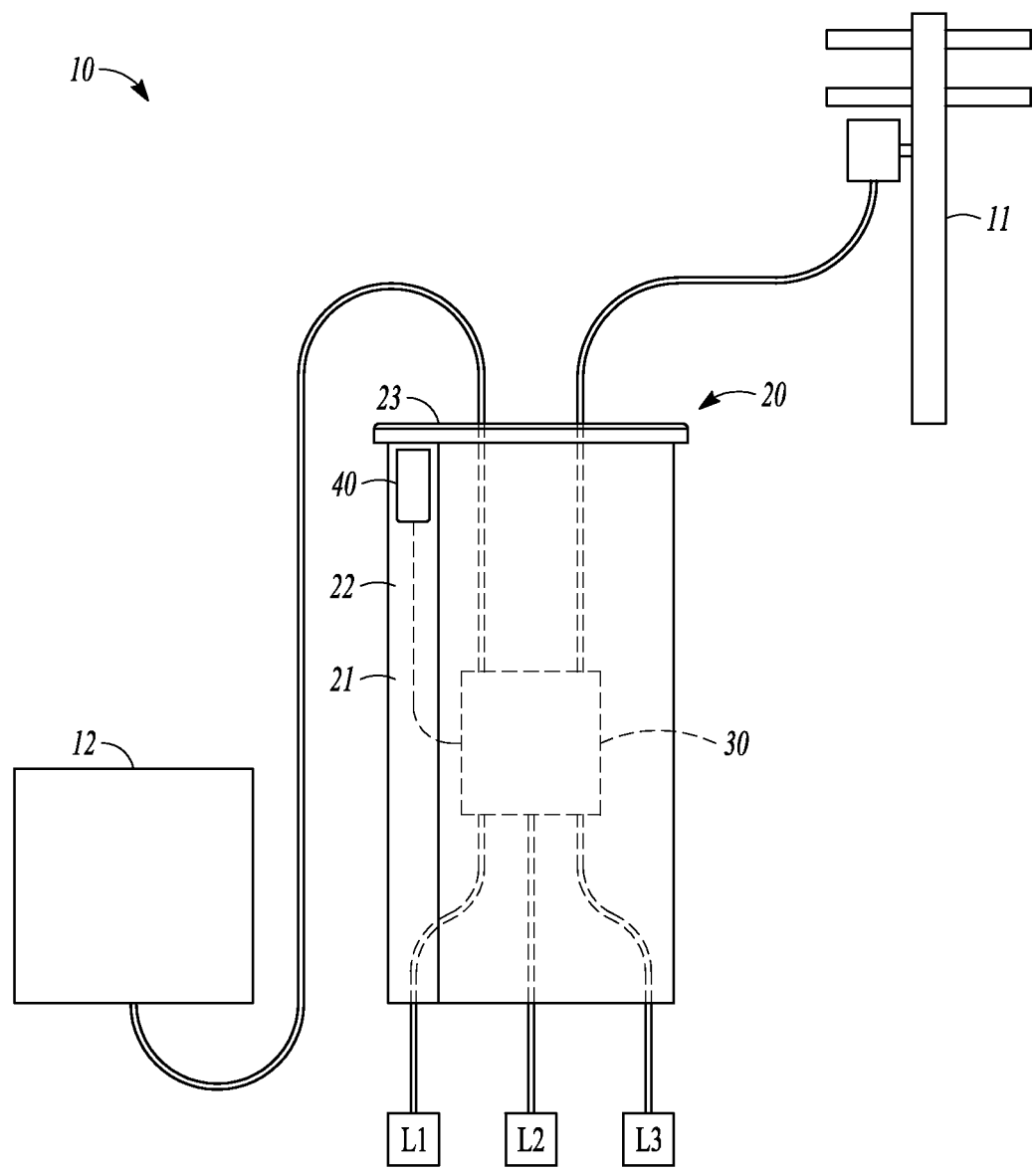
FIG. 1 is a schematic view illustrating an example power management system.

FIG. 1 illustrates an example power management system 10. The power management system 10 includes a primary power source 11 and a secondary power source 12. The power management system 10 further includes an enclosure 20 and an electrical component 30 located within the enclosure 20. The electrical component 30 is connected to the secondary power source 12 (and possibly the primary power source 11).

As shown in FIGS. 2-6, the power management system 10 further includes a membrane 40 that is mounted to an outside 21 of the enclosure 20. The membrane 40 extends through the enclosure 20 such that the membrane 40 provides information 41 relating to operation of the power management system 10.

In one example embodiment, the membrane 40 may be adhered to the enclosure 20. Other embodiments are contemplated where there are other forms of connection between the membrane and the enclosure 20.

Figure 4:
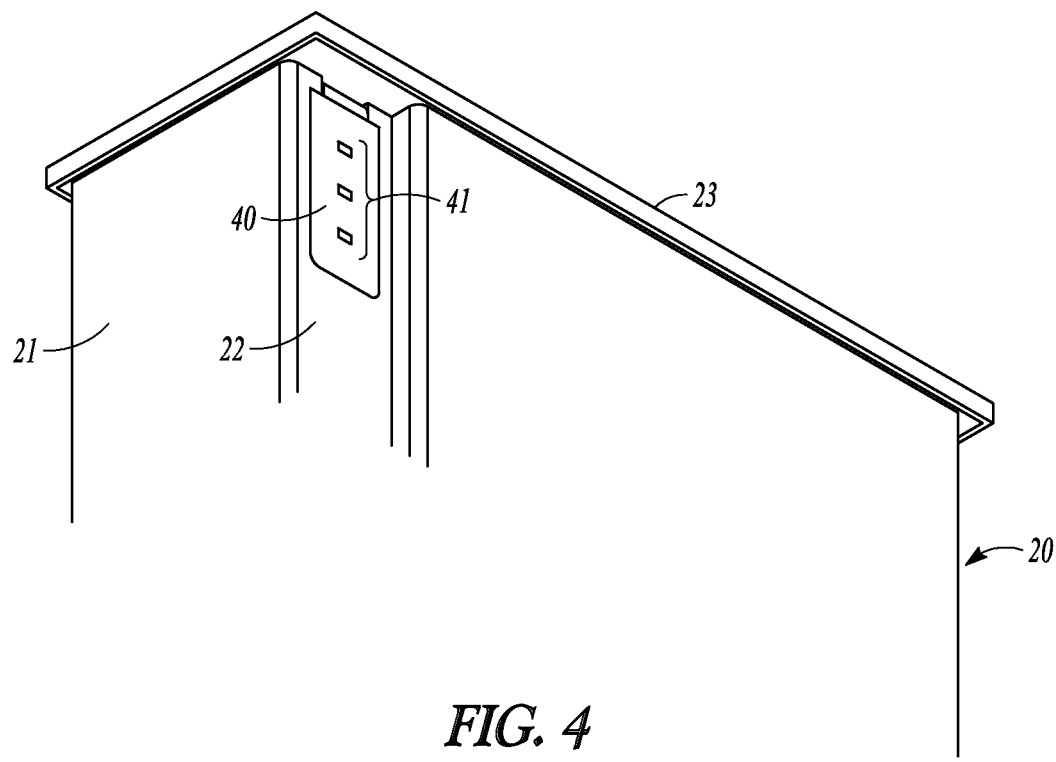
FIG. 4 is an enlarged perspective view of the example enclosure and membrane shown in FIG. 3.
Figure 5:
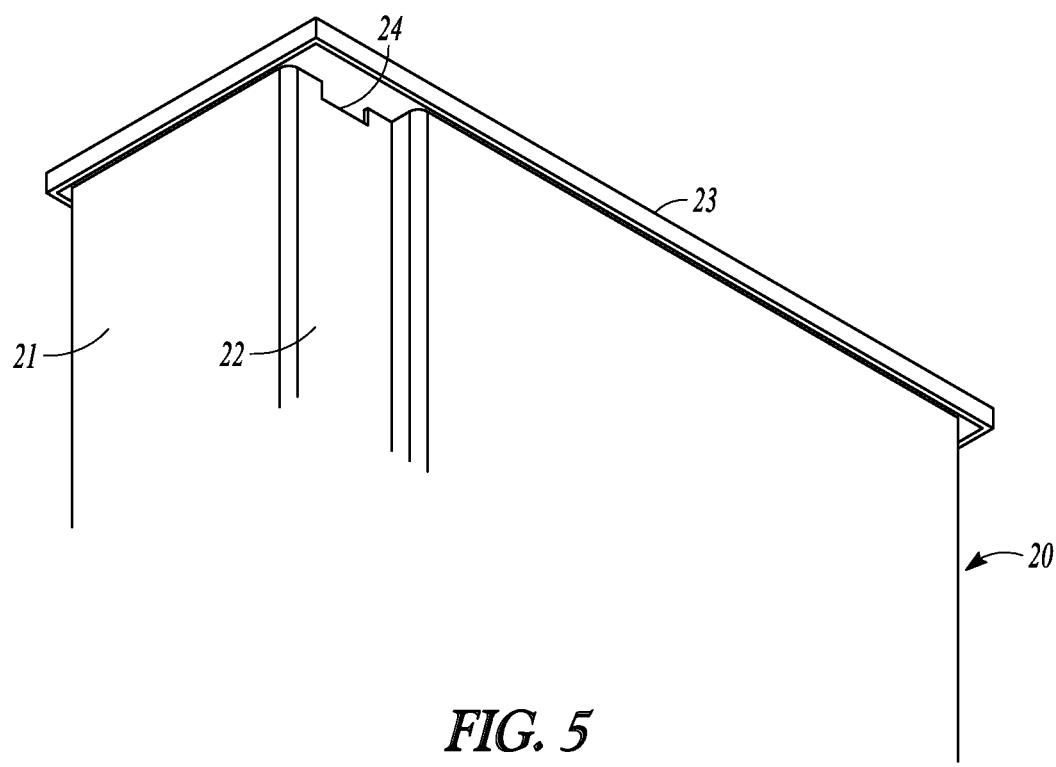
FIG. 5 is an enlarged perspective view similar to FIG. 4 with the example membrane removed to show an example opening in the enclosure.

In some embodiments, the enclosure 20 includes a channel 22 such that the membrane 40 is positioned within the channel 22 (shown most clearly in FIGS. 4 and 5). The channel 22 may be a variety of shapes and sizes and will depend in part on (i) the size and shape of the enclosure 20; and/or (ii) the size and shape of the membrane 40 (among other factors).

In the illustrated example embodiments, the membrane 40 extends through an opening 24 (see FIG. 5) in the enclosure 20 where the opening 24 is within the channel 22. The size and shape of the opening 24 will depend on the size and shape of membrane 40 that needs to pass through the opening 24 in order for the membrane 40 to be connected to the electrical component 30 located inside the enclosure 20.

Figure 3:
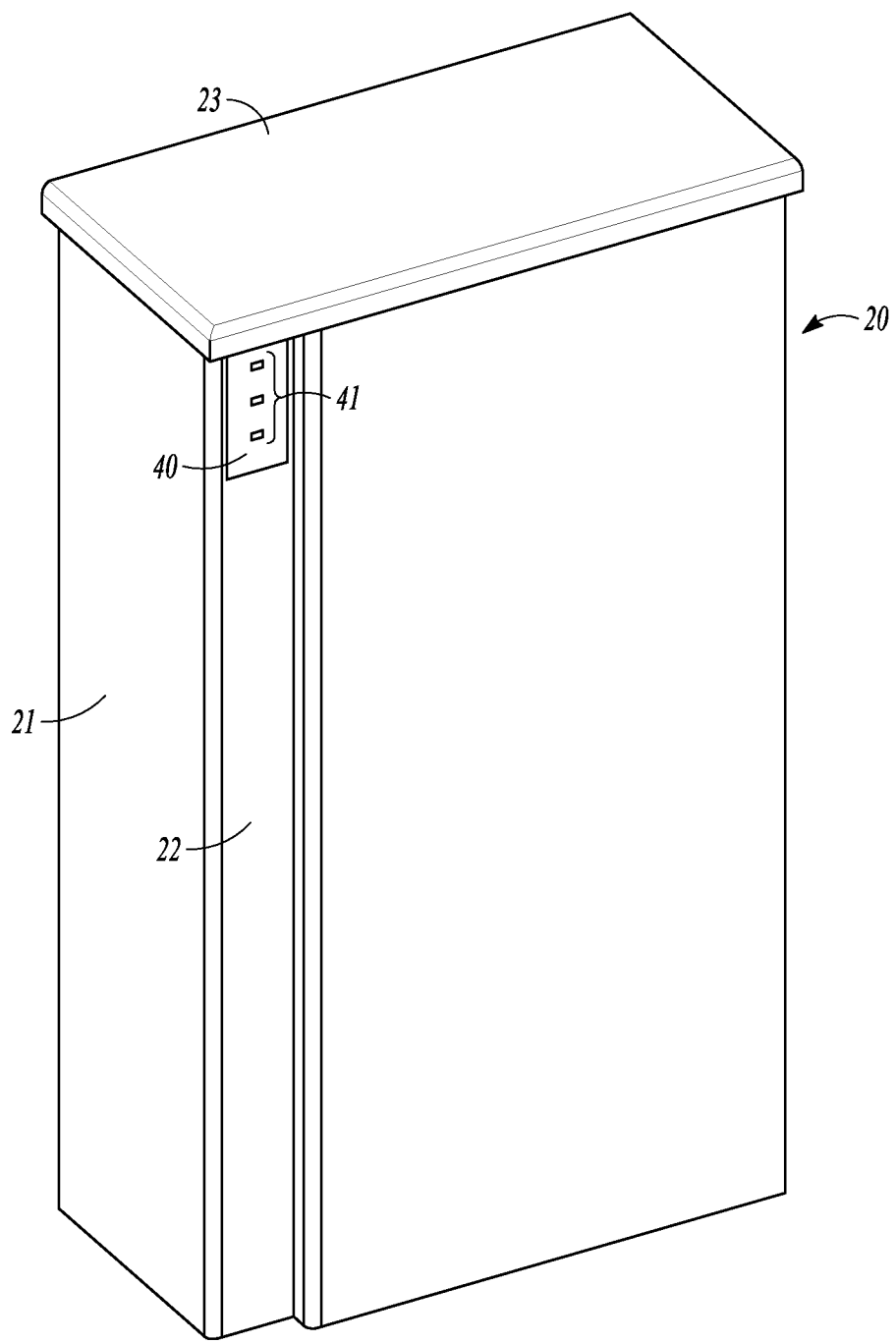
FIG. 3 is a perspective view of an example enclosure and membrane that may be used in the power management system of FIG. 1.

In addition, the enclosure 20 may include a roof 23 such that the membrane 40 is positioned below and adjacent to the roof 23 (shown most clearly in FIGS. 3-5). It should be noted that the enclosure 20 may be a water-proof enclosure. The type of enclosure 20 that is used in the power management system 10 will depend in part on the environment where the power management system 10 will be used (among other factors).

Figure 2:
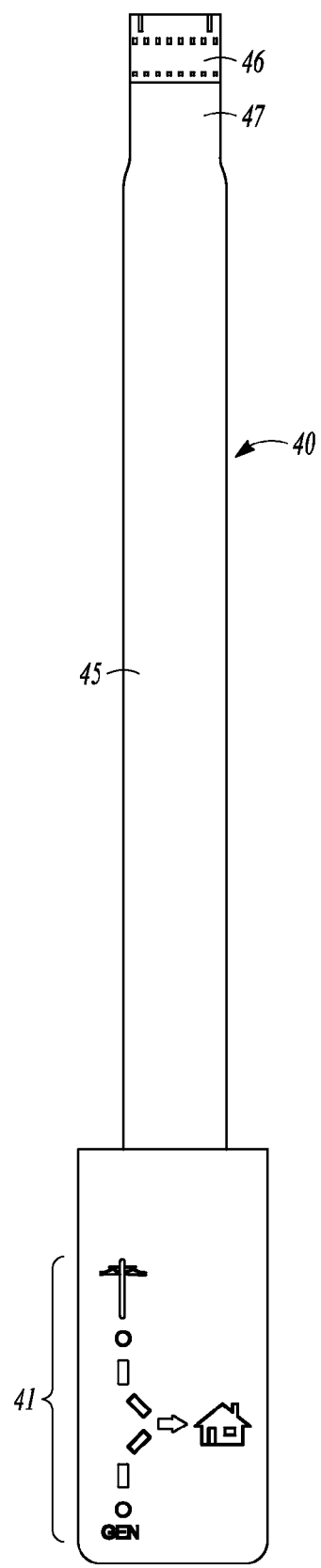
FIG. 2 is a plan view of an example membrane that may be used in the power management system of FIG. 1.
Figure 8:
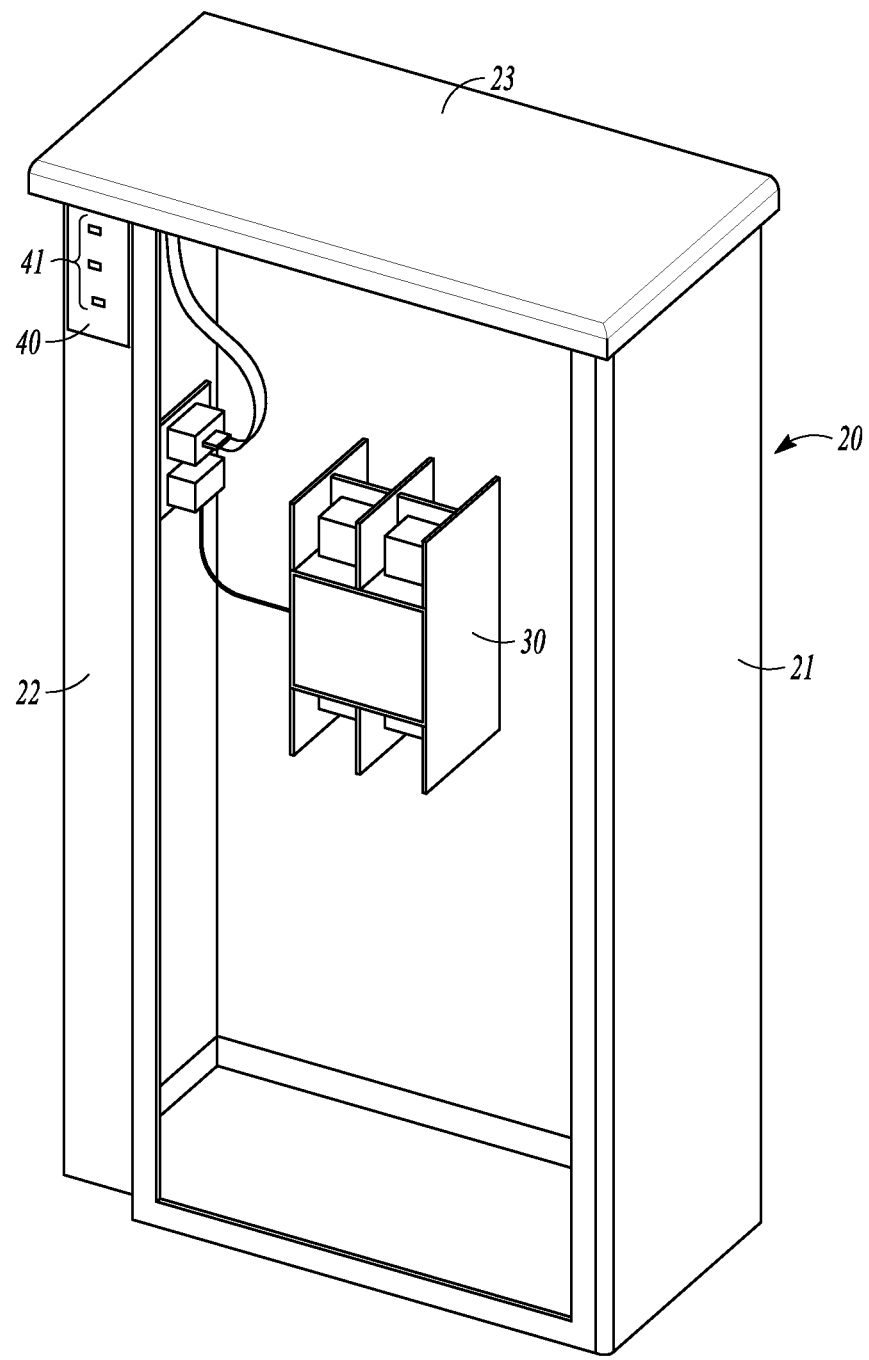
FIG. 8 is a perspective view of the inside of the example enclosure shown in FIG. 1.

As shown most clearly in FIGS. 2 and 8, the membrane 40 may include a flexible cable 45 that extends through the enclosure 20. In addition, the membrane 40 may include a connector 46 at an end 47 of the flexible cable 45. The connecter 46 is adapted to mate with the particular electrical component 30 that is inside the enclosure 20. As examples, the connector 46 may be a latching connector or a zero-force-insertion type connector.

In some embodiments, the membrane 40 may include an LED to provide information 41 relating to operation of the power management system 10. It should be noted that the membrane 40 may include other forms of indication may be used to provide information. As examples, the membrane 40 may include an incandescent bulb or a liquid crystal display (among others).

Figure 7:
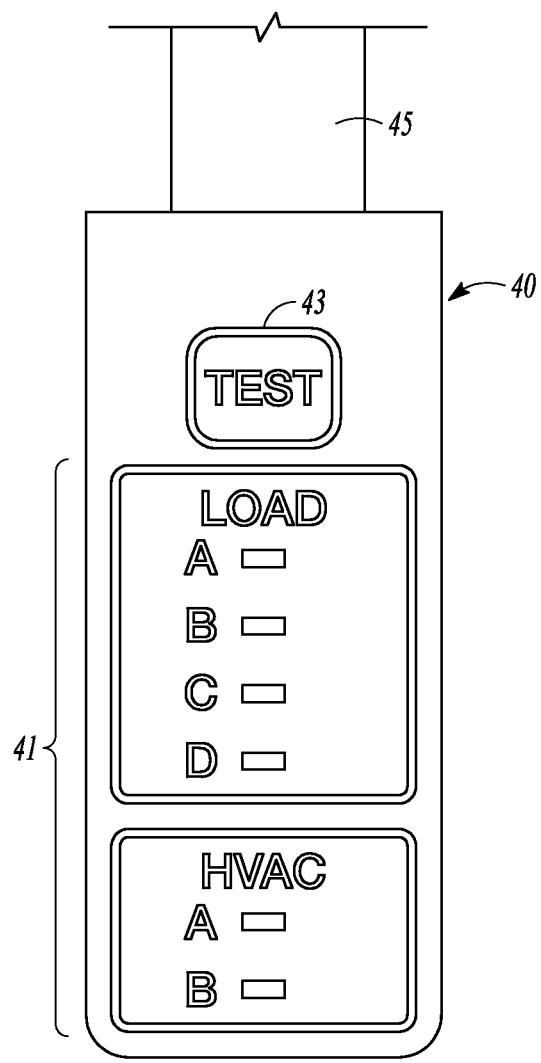
FIG. 7 is an enlarged plan view similar to FIG. 6 illustrating another example membrane that may be used in the power management system of FIG. 1.

In the example embodiment that is illustrated in FIG. 7, the membrane 40 includes an interface (see, e.g., push-button 43) that permits interaction with the power management system 10. As examples, the interface may be a dial, touch screen or some other conventional form of human-machine interface.

In some embodiments, the electrical component 30 may be an automatic transfer switch that is connected to the primary power source 11 and the secondary power source 12. As an example, the automatic transfer switch may be Model RXT residential automatic transfer switch manufactured by Kohler Company of Kohler, Wis. The membrane 40 provides information 41 relating to what sources (e.g., primary source 11 secondary power source 12) are available to power the loads L1, L2, L3.

Some example types of loads that may be supplied with power by the power management system 10 include air conditioning units, lights, appliances and hot tubs. As used herein, a load is anything that could be powered by the primary source 11 or the secondary source 12.

Figure 6:
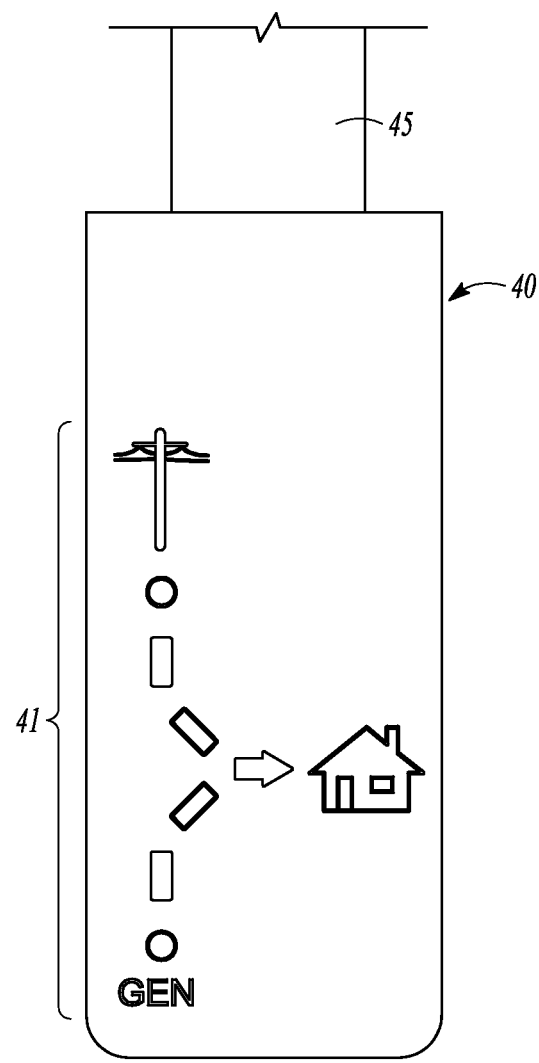
FIG. 6 is an enlarged plan view illustrating the membrane shown in FIG. 2.

One example of how such information 41 may be provided is shown in FIG. 6. In the example embodiment shown in FIG. 6, the membrane 40 provides information 41 relating to whether the loads are being powered by the primary power source 11 or the secondary power source 12 and which of the primary and secondary sources 11, 12 is supplying power at a point in time. It should be noted that the membrane 40 shown in FIG. 6 is just one example of the how the information 41 may be provided by the membrane 40.

In some embodiments, the electrical component 30 may be a load management system that is connected to the primary power source 11 and the secondary power source 12. The example membrane 40 shown in FIG. 7 may provide information 41 relating to which loads are being supplied with power by the power management system 10.

It should be noted that membrane shown in FIG. 7 is just one example of how the information 41 may be provided by the membrane 40. In addition, the membrane 40 may also (or alternatively) provide information 41 relating to what sources (e.g., primary source 11 secondary power source 12) are available to power the loads L1, L2, L3 (as shown in FIG. 6) and which of the primary and secondary sources 11, 12 is supplying power at a point in time.

In some embodiments, the electrical component 30 may a programmable interface module that is connected to the primary power source 11 and the secondary power source 12. In addition, the example membrane 40 may provide information 41 relating to which loads are being supplied with power by the power management system 10 (see, e.g., FIG. 7) and /or provide information 41 relating to whether the loads are being powered by the primary power source 11 or the secondary power source 12 and which of the primary and secondary sources 11, 12 is supplying power at a point in time (see, e.g., FIG. 6).

The programmable interface module may allow the power management system to perform control functions relating to the operation of the power management system 10. As examples, the programmable interface module may run applications such as common fault, Generator running, NFPA 110 Fault, Not in Auto, Running in Cool down, Loss of Utility at ATS and User Programmable to adapt to any load/application (among others). The applications/systems that may be at least partially controlled by the programmable interface module will depend in part on the type of environment where the power management system 10 is located and the type of devices that are to be powered by the power management system 10.

In some embodiments, the electrical component 30 may be a generator controller that is connected to the primary power source 11 and the secondary power source 12. As discussed above, the example membrane 40 shown in FIG. 6 may provide information 41 relating to which loads are being supplied with power by the power management system 10. In some embodiments, the membrane 40 may also provide information relating to whether the loads are being powered by the primary power source 11 or the secondary power source 12 (FIG. 6). As an example, the generator controller may be Model RDC2 or DC2 residential generator controller manufactured by Kohler Company of Kohler, Wis.

It should be noted that other embodiments are contemplated where the power management system 10 includes multiple enclosures 20 such that the electronic component 30 in each enclosure 20 includes at least one or more of the (i); automatic transfer switch; (ii) load management system; (iii) programmable interface module; and/or (iv) generator controller. The type, size, location and style of the enclosures 20 and the types of electronic components 30 included in the enclosures 20 will depend on a variety of design considerations. In addition, a membrane 40 may be on one, some or all of the enclosures 20.

The power management systems 10 described herein may provide a power management system that includes a cost-effective membrane which provides information to a user relating to operation of the power management system 10. In addition, the power management system may also reduce the need to expose users to potentially hazardous voltage during troubleshooting.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system for use with a power system that includes a primary power source and a secondary power source, the system comprising:
   an enclosure;
   an electrical component located within the enclosure, the electrical component being connected to the secondary power source; and
   a section of a membrane mounted to an outside surface of the enclosure and extending through a portion of the enclosure not covered by the section of the membrane such that the membrane provides information relating to operation of the system.

2. The system of claim 1 wherein the electrical component includes an automatic transfer switch that is connected to the primary power source and the secondary power source.

3. The system of claim 2 wherein the section of the membrane provides information relating to which of the primary power source and secondary power source are available to power a plurality of loads.

4. The system of claim 3 wherein the section of the membrane provides information relating to whether the plurality of loads are being powered by the primary power source or the secondary power source.

5. The system of claim 1 wherein the electrical component includes a load management system that is connected to the primary power source and the secondary power source.

6. The system of claim 5 wherein the section of the membrane provides information relating to which of a plurality of loads are being supplied with power by the power management system.

7. The system of claim 1 wherein the electrical component includes a programmable interface module that is connected to the primary power source and the secondary power source.

8. The system of claim 7 wherein the section of the membrane provides information relating to which loads are being supplied with power by the power management system.

9. The system of claim 1 wherein the electrical component includes a generator controller that is connected the secondary power source.

10. The system of claim 9 wherein the section of the membrane provides information relating to which of the primary power source and secondary power source are available to power the loads.

11. The system of claim 10 wherein the section of the membrane provides information relating to whether the loads are being powered by the primary power source or the secondary power source.

12. The system of claim 9 wherein the section of the membrane provides information relating to which loads are being supplied with power.

13. The system of claim 1 wherein the enclosure includes a channel such that the section of the membrane is positioned within the channel.

14. The system of claim 13 wherein the enclosure includes a roof such that the section of the membrane is positioned below and adjacent to the roof.

15. The system of claim 1 wherein the enclosure a waterproof enclosure.

16. The system of claim 1 wherein the section of the membrane includes a flexible cable that extends through the portion of the enclosure not covered by the section of the membrane.

17. The system of claim 16 wherein the section of the membrane includes a connector at an end of the flexible cable, the connecter mating with the electrical component.

18. The system of claim 1 wherein the section of the membrane includes an LED to provide information relating to operation of the system.

19. The system of claim 1 wherein the section of the membrane includes an interface to permit interaction with the system.

20. The system of claim 19 wherein the interface is a button.

21. The system of claim 19 wherein the section of the membrane is adhered to the enclosure.

* * * * *